US006479928B1

(12) United States Patent
Lee et al.

(10) Patent No.: US 6,479,928 B1
(45) Date of Patent: Nov. 12, 2002

(54) CATHODE RAY TUBE

(75) Inventors: Jong-hyuk Lee, Seoul; Jung-hwan Park, Suwon; Yoon-hyung Cho; Hae-seung Lee, both of Seoul; Dong-sik Zang, Suwon, all of (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

(21) Appl. No.: 09/577,881

(22) Filed: May 25, 2000

(30) Foreign Application Priority Data

May 31, 1999 (KR) .......... 99-19712
Aug. 3, 1999 (KR) .......... 99-31859

(51) Int. Cl.[7] .......... H04N 5/72

(52) U.S. Cl. .......... 313/461; 313/466; 313/112; 313/371

(58) Field of Search .......... 313/461, 466, 313/112, 371, 473, 474, 477

(56) References Cited

U.S. PATENT DOCUMENTS

| | | | |
|---|---|---|---|
| 4,019,905 | A | 4/1977 | Tomita et al. |
| 4,132,919 | A | 1/1979 | Maple |
| 5,068,568 | A | 11/1991 | de Vrieze et al. |
| 5,179,318 | A | 1/1993 | Maeda et al. |
| 5,200,667 | A | 4/1993 | Iwasaki et al. |
| 5,218,268 | A | 6/1993 | Matsuda et al. |
| 5,315,209 | A | 5/1994 | Iwasaki |
| 5,627,429 | A | 5/1997 | Iwasaki et al. |
| 5,756,197 | A | 5/1998 | Statz et al. |

FOREIGN PATENT DOCUMENTS

| | | |
|---|---|---|
| EP | 0 848 386 | 6/1998 |
| EP | 0 890 974 | 1/1999 |
| EP | 0 911 859 | 4/1999 |
| WO | 98/18736 | 5/1998 |
| WO | 98/49707 | 11/1998 |
| WO | 99/01883 | 1/1999 |

OTHER PUBLICATIONS (1) Hache et al., "Optical Nonlinearities of Small Metal Particles: Surface–mediated Resonance and Quantum Size Effects," 1986, pp. 1647–1655.

*Primary Examiner*—Vip Patel
*Assistant Examiner*—Ken Berck
(74) *Attorney, Agent, or Firm*—Lowe Hauptman Gilman & Berner, LLP

(57) ABSTRACT

A CRT has an improved contrast with a provision of a filter layer where nano-sized metal particles are dispersed in a dielectric matrix to selectively absorb light in predetermined wavelengths, specifically wavelengths between peak wavelengths of primary colors emitted by phosphors coated on the inner surface of the face plate. The improved contrast is a result of the metal particles in a dielectric matrix resonating with particular wavelengths and thus absorbing them.

18 Claims, 4 Drawing Sheets

CATHODE RAY TUBE

FIELD OF THE INVENTION

The present invention is related to a CRT and, more particularly, to its face plate having a light absorbing filter layer having a predetermined absorption peak/peaks.

BACKGROUND OF THE INVENTION

FIG. 1 shows a partial cross-section of the face plate with a phosphor layer coated of a conventional CRT. There are two sources of visible light coming out of the face panel. One is a light 1 emitted from phosphors when electron beams impinge on them. The other is external ambient light reflected from the face panel. The reflected light has in turn two components depending on where the incident external light is reflected. The first component is that reflected on the surface of the face panel. The other is that passes the whole thickness of the face panel but is reflected off at the phosphor surface. The ambient light reflected from the face plate has a uniform spectrum, degrading contrast of a CRT since the CRT is designed to emit light at only predetermined wavelengths and to display a color image by a selective combination of these predetermined wavelengths.

FIG. 2 shows is a spectral luminescence of P22 phosphor materials commonly used in the art. Blue phosphor ZnS:Ag, green phosphor ZnS:Au,Cu,Al and red phosphor Y2O2S:Eu have their peak wavelengths at 450 nm, 540 nm and 630 nm respectively. Reflected light components 2,3 have relatively higher illumination between these peaks since their spectral distribution is flat across all the visible wavelengths. Spectrum of light emitted from the blue and green phosphor has relatively broad bandwidths and thus some of wavelengths, from 450–550 nm, are emitted from both of the blue and green phosphors. The spectrum of red phosphor has undesirable side bands around 580 nm, at which wavelength the luminous efficiency is high. Therefore selective absorption of light in the wavelengths of 450–550 nm and around 580 nm would greatly improve contrast of a CRT without sacrificing luminescence of phosphors. By the way, because absorption of light around 580 nm makes the body color of a CRT appear bluish, external ambient light around 410 nm is preferably made to be absorbed in order to compensate for the bluish appearance.

Efforts have been made to find a way to selectively absorb light around 580 nm, 500 nm and 410 nm. For instance, U.S. Pat. Nos. 5,200,667, 5,315,209 and 5,218,268 all disclose forming on a surface of the face plate a film containing dye or pigments that selectively absorb light. Alternatively, a plurality of transparent oxide layers having different refraction and thickness were coated on the outer surface of a face plate to take advantage of their light interference for the purpose of reducing ambient light reflection. However, these patents fail to reduce light reflected off at the phosphor layer. So an intermediate layer was proposed, in U.S. Pat. Nos. 4,019,905, 4,132,919 and 5,627,429, to be coated between the inner surface of the face plate and the phosphor layer, absorbing predetermined wavelengths. Further U.S. Pat. Nos. 5,068,568 and 5,179,318 disclose an intermediate layer comprised of layers of high refraction and low refraction alternately.

SUMMARY OF THE PRESENT INVENTION

An objective of the present invention is to minimize the ambient light reflection without using a dye-dispersed layer or a plurality of transparent layers having different refraction.

DETAILED DESCRIPTION OF THE PRESENT INVENTION

Figure 1:
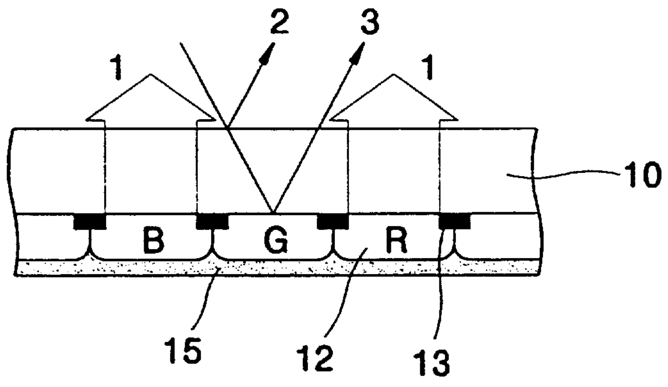
FIG.1 (PRIOR ART)
FIG. 1 is a partial cross-section of a conventional CRT face panel.
Figure 2:
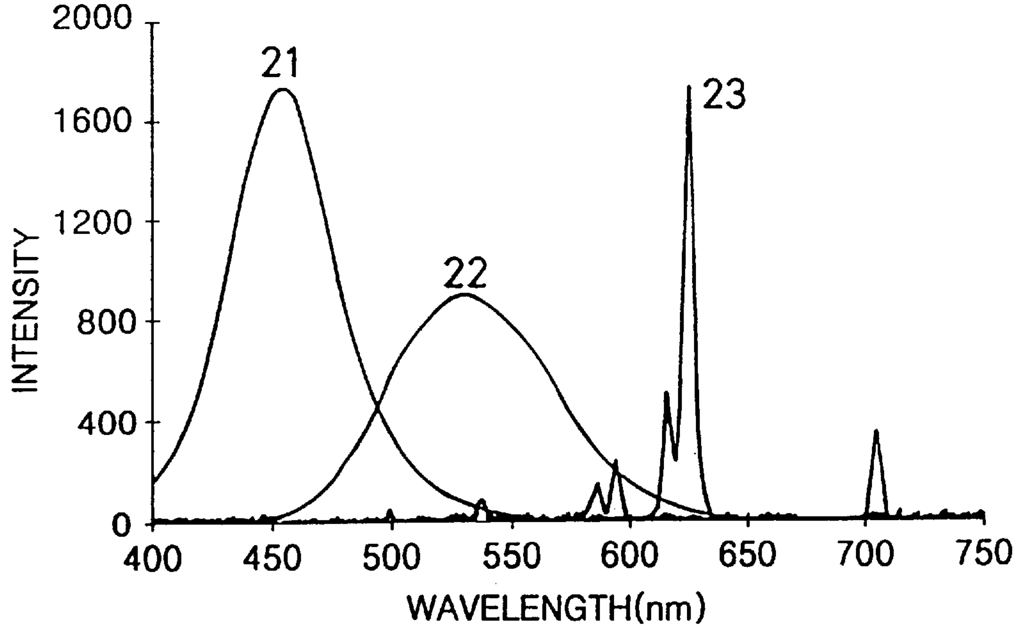
FIG.2 (PRIOR ART)
FIG. 2 is spectral luminescence distributions of conventional phosphors used on a conventional CRT face panel.
Figure 3A:
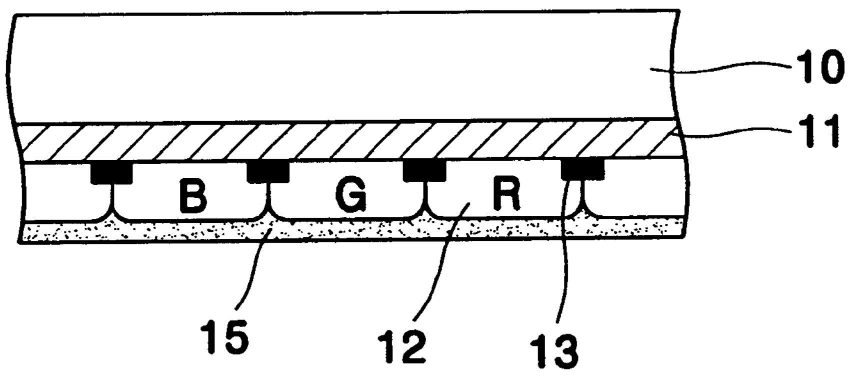
FIG. 3*a* is a partial cross-section of a CRT face panel according to the present invention.
Figure 3B:
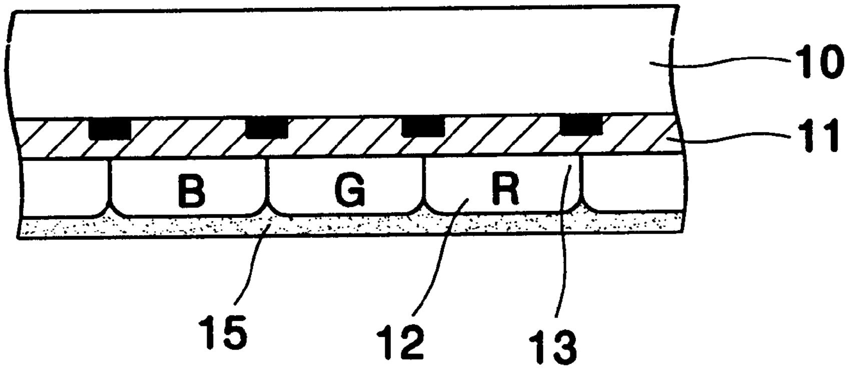
FIG. 3*b* is a partial cross-section of a CRT face panel according to an embodiment of the present invention.

FIG. 3*a* is a cross section of a CRT face plate according to the present invention. The face plate comprises a glass panel 10, a phosphor layer 12 and a filter layer 11 disposed in between. Here black matrix is formed between the phosphors after the filter 11 has been coated on the glass panel 10. The filter layer is a film of dielectric matrix dispersed with minute metal particles, as opposed to pigments used in the prior art, taking advantage of surface plasma resonance (SPR) of the metal particles in a dielectric matrix. The filter layer has an light absorption peak at about 580 nm.

SPR is a phenomenon where electrons on the surface of nano-sized metal particles in a dielectric matrix, such as silica, titania, zirconia, resonate in response to electric field and absorb light in a particular bandwidth. See J. Opt. Soc. Am. B vol. 3,No.12/December 1986, pp 1647–1655 for details. Here "nano-size" is defined to from several nanometers to hundreds of nanometers. In other words a "nano-sized particle" is a particle greater than 1 nanometer but less than 1 micrometer in diameter. For example, for a dielectric matrix of silica having gold (Au), silver (Ag) and copper (Cu) particles less than 100 nm in diameter light is absorbed around the wavelength of 530 nm, 410 nm and 580 nm respectively. With platinum (Pt) or palladium (Pd) light absorption spectrum is rather broad from 380 nm to 800 nm depending on the kind of matrix. A particular wavelength absorbed depends on kinds of dielectric matrix, i.e., its refraction, kind of metal and size of such metal particles. It is known that refraction ratios of silica, alumina, ziroconia and titania are 1.52, 1.76, 2.2 and 2.5–2.7 respectively.

Kinds of metal that can be used include transition metals, alkali metals and alkali earth metals. Among them gold, silver, copper, platinum and palladium are preferred since they absorb visible light. Generally with the size of metal particles increased until it reaches 100 nm its absorbing ratio tends to increase. Above the 100 nm, as the size increases the absorption peak moves toward long wavelengths. Accordingly the size of the metal particles affects both the absorption ratio and the absorption peak wavelength.

The preferred amount of metal particles is 1–20 mol % with respect to the total mol of the dielectric matrix. Within this range light desired absorption ratio and absorption peak can be selected.

A filter using silica matrix and gold particles with an absorption peak at 530 nm can be made to absorb light around 580 nm by the following methods. One is to add a second dielectric material such as Titania, Alumina or Zirconia having greater refraction so that its absorption peak moves toward longer wavelength. An added amount will determine the absorption ratio. The absorption ratio of an absorption peak should be set taking into account the transmission efficiency of a glass panel and the density of the filter. Generally absorption peak and ratio are preferred to high. Second method is to increase the size of the gold particles without addition of a second dielectric material. Because the metal particles are coated in a film using sol-gel on a surface of the glass panel, the size of the metal particles can be changed by varying the amount of water, kind and amount of catalyst and rate of temperature change in a heat treatment. For instance either the more water is added or the longer the heat treat is the larger the particles become. In addition when light around 580 nm wavelength is absorbed the light is preferably further absorbed around 410 nm to make the panel appear not bluish.

For a dielectric matrix, at least one of the group consisting of silica $SiO_2$, titania $TiO_2$, ziroconia $ZrO_2$, and alumina $Al_2O_3$. A combination of silica and titania is preferred each with 50 weight %. Another combination of ziroconia and alumina with a mole ration of 8:2 may be used. FIG. **3*b* shows another embodiment of the present invention where the black matrix 13 is formed prior to coating of the filter having the same characteristics as one in FIG. 3*a*. In other words, black matrix is patterned on the inner surface of a glass face panal. An SPR filter layer as described for FIG. 3*a*** is coated on top of the black matrix to completely cover the inner surface. Finally phosphor layer is formed on the filter layer, corresponding to the black matrix below. This embodiment illustrates that where the black matrix is placed is not critical in the present invention.

Figure 4:
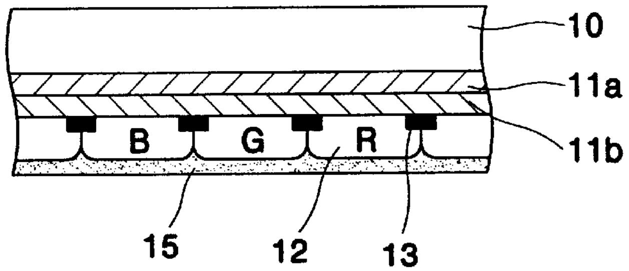
FIG. 4 is a partial cross-section of a CRT face panel according to another embodiment of the present invention.

FIG. 4 is another embodiment of the present invention where a plurality of filter layers **11*a*, 11*b*** are used. Each of the filter layers can be different in terms of the size of the metal particles and kinds of the dielectric matrix such that ambient light of two different wavelength ranges, around 580 nm and below 410 nm for example, can be absorbed. One of the filters can have an absorption peak at 580 nm while the other can have it at 410 nm. The order in which the plurality of different filters are layered is not material so that it may be switched. The figure only shows two layers of filters but more than two filter layers can be employed for absorbing an additional wavelength. Moreover, a single matrix layer having more than two different metal particles, each having a different absorption peak, may be used.

Figure 5:
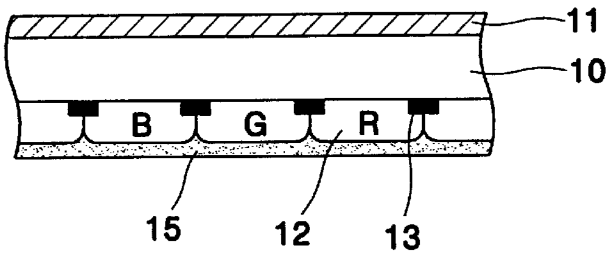
FIG. 5 is a partial cross-section of a CRT face panel according to another embodiment of the present invention.

FIG. 5 illustrates a filter layer with minute metal particles dispersed therein on the outer surface of the glass panel for reducing light reflection off the outer surface. Though not shown in the drawings more than one filter layer can be applied on the outer surface, having absorption peaks at different wavelengths.

Figure 6:
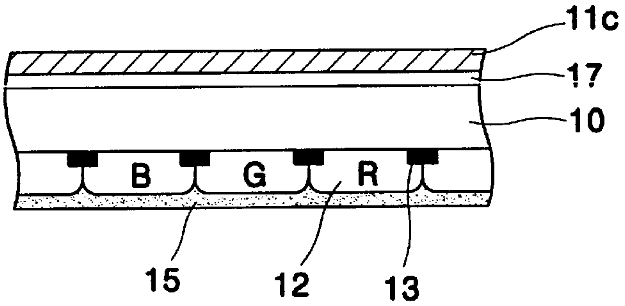
FIG. 6 is a partial cross-section of a CRT face panel according to another embodiment of the present invention.

FIG. 6 shows a glass panel with a conductive film 17 for preventing static and a protection layer **11*c* for both protecting the panel from scratches and reducing light reflection. Generally the conductive film 17** includes indium tin oxides (ITO) and the protection layer is made of silica. According to the present invention minute metal particles are added to silica sol prior to forming of the silica protection layer. Thus the protection layer serves an extra function of selective light absorption.

Figure 7:
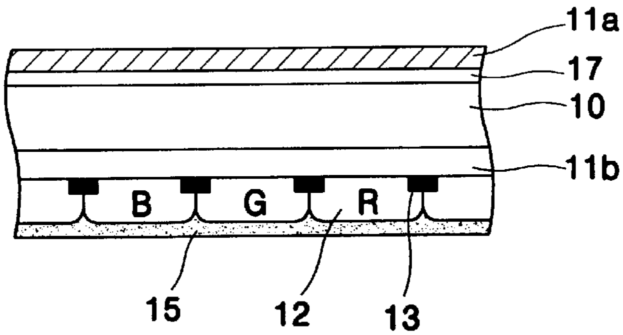
FIG. 7 is a partial cross-section of a CRT face panel according to another embodiment of the present invention.

FIG. 7 shows a glass panel both surfaces of which are coated with a dielectric matrix film with minute metal particles dispersed therein. For instance, a first film **11*a*** on the outside can be designed to absorb light around 580 nm and a second film on the inside can be designed to absorb light around 500 nm or 410 nm. Two films having different wavelength absorption can of course be switched.

EXAMPLES

Example 1

4.5 g of tetraethyl-ortho-silicate (TEOS) was dispersed in a solvent consisting of 30 g of reagent methanol, 30 g of ethanol, 12 g of n-buthanol and 4 g of de-ionized water. 5 g of $HAuCl_4$ $4H_2O$ was added to thus dispersed solvent and stirred at the room temperature for 24 hours to prepare a solution A.

36 g of ethanol, 1.8 g of pure water, 2.5 g of acid (35% density) were added to 25 g of titanium iso-propoxide (TIP) and the mixture was stirred at the room temperature for 24 hours to prepare a solution B.

A coating material was prepared by mixing 12 g of solution A, 3 g of solution B, and 12 g of ethanol so that the content of gold was 12-mol % and the mol ratio of titania and silica was 1:1.

Black matrix was formed on a 17-inch CRT face panel, and 50 ml of the coating material was spin-coated on the panel spinning at 150 rpm. The coated panel was heated at 450° C. for 30 minutes. Next, phosphor layer was formed on the panel in a conventional way.

Figure 8:
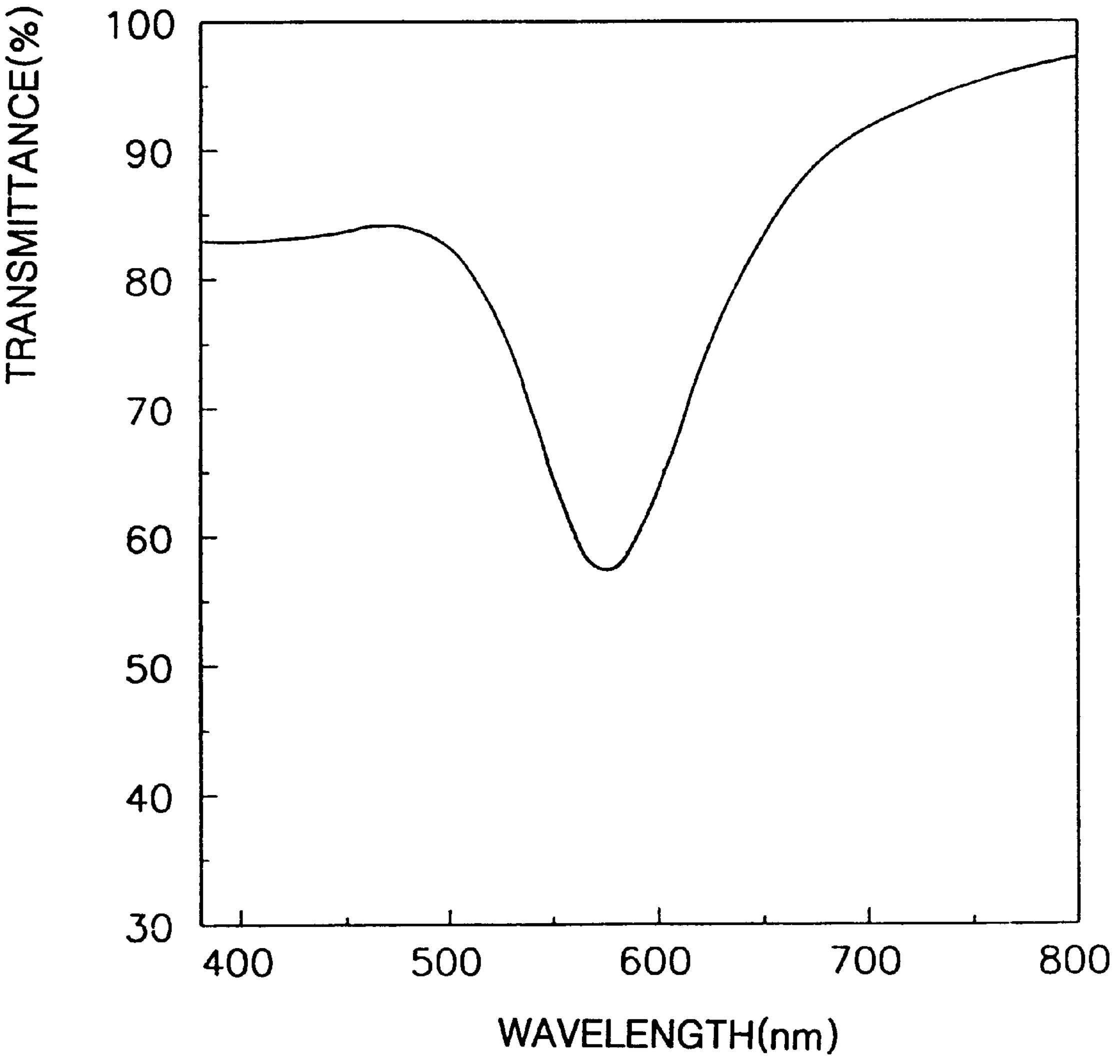
FIG. 8 is a spectral transmission distribution of a filter according to the present invention.

The thus-made panel had an absorption peak at 580 nm as shown in FIG. 8. The contrast, brightness and endurance were tested satisfactory.

Example 2

$HAuCl_4$ was replaced by $NaAuCl_3$ with other things being equal to those of Example 1.

Example 3

$HAuCl_4$ was replaced by $AuCl_3$ with other things being equal to those of Example 1.

Example 4

Tetraethyl-ortho-silicate (TEOS) and titanium iso-propoxide (TIP) were respectively replaced by zirconium ethoxide, $Zr(OC_2H_5)_4$, and aluminum sec-buthoxide, $Al(OC_4H_9)_4$, and mol ratio of zirconia and alumina is 4:1 with other things being equal to those of Example 1.

Example 5

The coating material was coated on the outer surface of a face panel and the coated panel was heated at a temperature of 200–250° C. while other manufacturing process is equal to that of Example 1.

Example 6

The coated panel made in Example 5 was preheated at 100° C. and pure water and hydrazine, with a ratio of 9:1 in weight % was additionally coated and heated at 200° C.

Example 7

$HAuCl_4$ was replaced by $NaAuCl_3$ with other things being equal to those of Example 5.

Example 8

$HAuCl_4$ was replaced by $NaAuCl_3$ with other things being equal to those of Example 6.

Example 9

2.5 g of indium tin oxide (ITO) having an average particle diameter of 80 nm was dispersed in a solvent consisting of 20 g of methanol, 67.5 g of ethanol and 10 g of n-butanol to prepare a coating material.

50 ml of the coating material was spin coated in the same way as in Example 1 and the coating material of Example 1 was additionally spin coated to embody the present invention as shown in FIG. 6.

Example 10

The double-coated panel made in Example 9 was preheated at 100° C. and de-ionized water and hydrazine, with a ratio of 9:1 in weight % was additionally coated and heated at 200° C.

Example 11

$HAuCl_4$ was replaced by $NaAuCl_4$ with other things being equal to those of Example 9.

Example 12

$HAuCl_4$ was replaced by $NaAuCl_4$ with other things being equal to those of Example 10.

CRT face panels of Examples 2–12 all had an absorption peak at 580 nm while contrast, brightness and endurance were tested satisfactory.

Example 13

A new coating material as the same as that in Example 1 was prepared except that $HAuCl_4$ was replaced with $AgNO_3$ and silver content was 5 mol %. The coating material of Example 1 was spin-coated on a surface of a CRT face panel and the new coating material was spin-coated while all other manufacturing process is equal to that of Example 1 for the purpose of providing an embodiment of the present invention as shown in FIG. 4.

Example 14

The new coating material of Example 13 was coated on the inner surface of a CRT face panel made in Example 9 for the purpose of providing an embodiment of the present invention as shown in FIG. 7.

Example 15

A new coating material as the same as that in Example 1 was prepared except that $AgNO_3$ was used with $HAuCl_4$ and silver and gold contents were 5 and 12 mol % respectively based on total mol of dielectric matrix. All other manufacturing process was equal to that of Example 1.

CRT face panels of Examples 13–15 all had main absorption peaks at 410 nm and 580 nm with contrast, brightness and endurance satisfactory.

What is claimed is:

1. A cathode ray tube (CRT) comprising;

a glass panel;

at least one filter layer, coated on the inner surface of said glass panel, of a dielectric matrix with nano-sized minute metal particles dispersed therein and having at least one absorption peak at a predetermined wavelength, and a phosphor layer formed on said at least one filter layer.

2. A cathode ray tube according to claim 1, wherein said metal particles are of a metal selected from the group consisting of gold, silver, copper, platinum and palladium.

3. A cathode ray tube according to claim 1, wherein the content of said metal particles is 1–20 mol % with respect to the total mol of the dielectric matrix.

4. A cathode ray tube according to claim 1, wherein said dielectric matrix is of at least one dielectric selected from the group consisting of silica, titania, zirconia and alumina.

5. A cathode ray tube according to claim 4 wherein said dielectric matrix comprises either silica and titania in a mole ratio of 1:1 or zirconia and alumina in a mole ratio of 8:2.

6. A cathode ray tube according to claim 1, wherein said at least one filter is single layer and said metal particles are of more than two different metals such that said filter has more than two absorption peaks at more than two different wavelengths.

7. A cathode ray tube comprising;

a glass panel;

at least one filter layer, coated on the outer surface of said glass panel, of a dielectric matrix with nano-sized minute metal particles dispersed therein and having at least one absorption peak at a predetermined wavelength, and a phosphor layer formed on the inner surface of said glass panel.

8. A cathode ray tube according to claim 7, wherein said metal particles are of a metal selected from the group consisting of gold, silver, copper, platinum and palladium.

9. A cathode ray tube according to claim 7, wherein the content of said metal particles is 1–20 mol % with respect to the total mol of the dielectric matrix.

10. A cathode ray tube according to claim 7, wherein said dielectric matrix is of at least one dielectric selected from the group consisting of silica, titania, zirconia and alumina.

11. A cathode ray tube according to claim 10, wherein said dielectric matrix comprises either silica and titania in a mole ratio of 1:1 or zirconia and alumina in a mole ratio of 8:2.

12. A cathode ray tube according to claim 7, wherein said at least one filter is a single layer and said metal particles are of more than two different metals such that said filter has more than two absorption peaks at more than two different wavelengths.

13. A cathode ray tube comprising;

a glass panel;

a first filter layer, coated on the inner surface of said glass panel, of a dielectric matrix with nano-sized minute metal particles dispersed therein and having at least one absorption peak at a first predetermined wavelength;

a second filter layer, coated on the outer surface of said glass panel, of a dielectric matrix with nano-sized minute metal particles dispersed therein and having at least one absorption peak at a second predetermined wavelength; and a phosphor layer formed on said first filter layer.

14. A cathode ray tube according to claim 13, wherein said metal particles are of a metal selected from the group consisting of gold, silver, copper, platinum and palladium.

15. A cathode ray tube according to claim 13, wherein the content of said metal particles is 1–20 mol % with respect to the total mol of the dielectric matrix.

16. A cathode ray tube according to claim 13, wherein said dielectric matrix is of at least one dielectric selected from the group consisting of silica, titania, zirconia and alumina.

17. A cathode ray tube according to claim 16, wherein said dielectric matrix comprises either silica and titania in a mole ratio of 1:1 or zirconia and alumina in a mole ratio of 8:2.

18. A cathode ray tube according to claim 13, wherein said at least one filter is a single layer and said metal particles are of more than two different metals such that said filter has more than two absorption peaks at more than two different wavelengths.

* * * * *